Sept. 15, 1936. A. ABRAMS ET AL 2,054,115
COMPOSITION FOR COATING, LAMINATING, AND FILM FORMING
Filed Sept. 16, 1935 2 Sheets-Sheet 1

Patented Sept. 15, 1936

2,054,115

UNITED STATES PATENT OFFICE 2,054,115

COMPOSITION FOR COATING, LAMINATING, AND FILM FORMING

Allen Abrams, Charley L. Wagner, and George W. Forcey, Wausau, Wis., assignors to Marathon Paper Mills Company, Rothschild, Wis., a corporation of Wisconsin Application September 16, 1935, Serial No. 40,765

20 Claims. (Cl. 106—23)

This invention relates to compositions suitable for use as an adhesive, for coating or laminating fabrics, and also for formation into flexible self-sustaining films or sheets.

In the copending application of Abrams and Wagner entitled "Sheet or film forming or coating composition and a method of preparing the same", Serial No. 693,740, filed October 16, 1933, there is disclosed a method of dissolving rubber, or rubber-like substance, in a wax, or wax-like substance, to form compositions having relatively high viscosities and adapted for use both as a coating composition and also in the formation of self-sustaining sheet or film material. The present invention is a continuation in part of the aforementioned application.

We have found, for example, that mixtures of rubber and wax, when prepared in certain proportions and under certain conditions to give mixtures of relatively high viscosities, can be used for coating, laminating or can be converted into self-sustaining sheets or films that have desirable heat sealing properties which may be used for sealing purposes generally or for wrapping purposes. Properties that make this sheet or film material especially valuable for wrapping purposes are its pliability and stretchability and its moisture- and waterproofness. Sheets or films of rubber-wax compositions are, further, comparatively translucent. These rubber-wax compositions furthermore can be readily colored to give pleasing and attractive wrappings and made opaque.

We have found that our compositions of suitable viscosity can be converted directly into flexible, self-sustaining sheets or films in a continuous manner, without the use of volatile solvents.

It is therefore an important object of this invention to produce thermoplastic compositions suitable for coating or laminating fabrics or for direct conversion into self-sustaining flexible films or sheets.

It is also an object of our invention to prepare compositions from wax or wax-like substances and rubber or rubber-like substances which are solid and non-tacky at room temperature and heat sealing at higher temperature, and which are adapted for adhesive purposes, for coating or uniting web or sheet material, and for direct formation into flexible self-sustaining sheets or films.

It is a further object of this invention to prepare solid, non-tacky, tasteless, odorless paraffin wax-rubber compositions, which are adapted to produce a tough, flexible, thermoplastic coating and also for use as adhesive for paper, textiles or other web or sheet material and which will render them moistureproof, gasproof, and waterproof.

It is a further object of this invention to prepare paraffin and wax-rubber compositions adapted for forming heat-sealing coatings or non-heat sealing coatings as desired and which will not substantially impregnate or strike through the paper or other fabric during the coating operation.

Another important object of this invention is to provide a method of compounding thermoplastic substances, such as rubber and paraffin-wax with or without vulcanizing agents, so as to produce the proper viscosity and adhesiveness suitable for coating and laminating fabrics, or for conversion into flexible films or sheets.

A further object of this invention is to provide a self-sustaining sheet or film material from solutions or mixtures of rubber and a wax or rubber-like substances or wax-like substances, the sheet or film material having excellent moistureproofness and waterproofness and being particularly adapted for the wrapping of articles where these qualities are required.

It is a further important object of this invention to provide a self-sustaining, flexible film of good transparency and gloss, prepared from a vulcanizable rubber-paraffin wax composition which is subsequently vulcanized.

It is a further important object of this invention to provide a self-sustaining film of a rubber-wax composition that is relatively resistant to the action of oxygen and light.

It is a further important object of this invention to provide flexible, heat sealing, self-sustaining films or sheets of a substantially uniform thickness of the order of a few thousandths of an inch, prepared from solutions of rubber and paraffin wax having relatively high viscosities.

Other and further important objects of this invention will be apparent from the disclosures in the specification and the accompanying drawings.

The manner of converting our composition into a heat sealing film and sheet material or of utilizing it for coating and laminating fabrics of this invention is diagrammatically illustrated in the drawings and hereinafter more fully described.

We have found that it is possible by adding suitable binders under controlled conditions to certain thermoplastic substances which are brittle and not flexible at ordinary temperatures to render such thermoplastic substances pliable and flexible to a remarkable degree. We have, for example, discovered that substances such as paraffin wax or certain types of asphalt which are brittle and not flexible at ordinary temperatures can be rendered pliable and flexible by adding thereto certain binders such as rubber, gutta percha, "Vispronal," formerly sold under the name "Viskanol," (a solid rubber-like substance consisting of a straight hydrocarbon produced by suitably polymerizing some of the unsaturated hydrocarbon gases produced in cracking petroleum), and similar binding agents.

We have also found that by properly controlling the proportions and compounding conditions, we can uniformly produce compositions having a desired predetermined viscosity and cohesiveness whereby they can be employed as an adhesive, for coating or laminating fabrics, as well as for conversion directly into self-sustaining sheets or films.

The major ingredient or body of our composition thus consists essentially of a thermoplastic substance which is not flexible or pliable at ordinary temperatures. Such body substance is furthermore solid at normal temperatures, but liquefies at higher temperatures, is insoluble in water and acts as a dispersing medium or solvent for the binder which is added thereto. Any substance having the aforementioned properties can be used for our invention, as, for example, paraffin-wax, beeswax, spermaceti, asphalt, etc.

The binder which we add to our body portion is thermoplastic, insoluble in water and solid at ordinary temperatures. It is furthermore elastic, flexible and has strong adhesive properties. It is dispersible or soluble in the body portion. Any natural or synthetic substances having the aforementioned properties may be used as our binder, as, for example, rubber, balata, gutta percha, "Vispronal", formerly sold under the name "Viskanol", or other artificial gummy or rubber-like substances, singly or in combination with one another.

By properly compounding these substances in suitable proportions and under carefully controlled conditions so as to produce the proper viscosity hereinafter more fully described we have obtained compositions which have distinctly new properties and which have important commercial uses.

Our inventive concept may be illustrated more specifically in considering a thin sheet of paraffin-wax. This sheet is brittle, lacks tensile strength and readily breaks upon slight bending. On account of these properties it is therefore not possible to make ordinary paraffin-wax into thin self-sustaining continuous sheets or films and to roll them tightly into a compact package. By the addition to the paraffin-wax of a small proportion of a binder, such as rubber under properly controlled compounding conditions, we have been successful in producing thin, continuous, flexible, non-tacky, self-sustaining films or sheets from the paraffin-wax. Such sheets can be rolled up tightly into compact rolls for subsequent use as desired.

Our composition is furthermore very useful for coating and laminating purposes as disclosed in copending application Serial No. 693,741, filed October 16, 1933. When properly compounded so as to have a viscosity of not less than 8000 secs. (50 c. c. measured on a Scott viscosimeter at 90° C.), the tendency of the composition to strike through paper is minimized with the result that a superficially adherent coating is produced which is flexible, non-tacky, moistureproof, waterproof and gasproof.

A specific embodiment of our composition adapted for coating, laminating, or direct conversion into flexible sheets or films comprises a composition of rubber, or a rubber-like substance, and a wax, or a wax-like substance. Suitable rubber and rubber-like substances include pale crepe rubber, smoked sheet rubber, vulcanizable rubbers generally and gutta percha. We have successfully used paraffin-wax, beeswax, spermaceti, and other waxes, in the preparation of our composition, singly or in combination with one another. However, pale crepe rubber and paraffin-wax are the ingredients which we prefer to use, for producing a substantially colorless and tasteless product.

The proportion of pale crepe rubber to paraffin-wax may, in general, vary between 6% rubber, 94% paraffin-wax and 30% rubber, 70% paraffin-wax by weight. Using other rubber-like and wax-like substances the proportions should be so chosen as to give suitable viscosities of at least 8000 secs. (Scott).

The following will illustrate a preferred composition of our invention and a preferred method of preparing the composition:

| | Percent by weight |
|---|---|
| Paraffin-wax, melting point between 120 and 180° F. | 85 to 88 |
| Pale crepe rubber sheets 0.020 to 0.050 inches in thickness | 15 to 12 |

The composition must be prepared under carefully regulated conditions which we have determined by long study and experimentation. The paraffin-wax is first melted by heating in a jacketed vessel, preferably provided with a kneader type of stirrer, to a temperature of about 200–210° F. The individual sheets of rubber are then carefully added to the bath so that the surfaces are completely wetted with the molten paraffin as they are being immersed in the bath so as to avoid sticking and welding of the rubber sheets to each other in the bath.

In the case of the lower concentrations of rubber, up to about 15%, there is an adequate volume of wax to facilitate good soaking of the rubber. The main precautions involved in effecting a solution of this kind is a careful addition of the rubber as described and correct mixing procedure. Concentration of from 10 to 15% rubber have a final viscosity sufficient to pull apart soft lumps of rubber which are not properly soaked; concentrations below 10% rubber in wax do not build up such a high viscosity and consequently rigid precaution must be taken to secure proper soaking.

In considering concentrations ranging from 15 to 25% rubber in paraffin-wax it is necessary to add the rubber quickly so that the rubber added last will have an adequate chance to soak up its share of the wax. This range of concentrations has a resulting high viscosity which enables the batch to pull apart lumps which would ordinarily cause trouble in lower concentrations.

It is necessary to use another method for mixing rubber and paraffin-wax in concentrations above 25% rubber. This method resembles somewhat the present commercial method for compounding rubber. The rubber is "broken down" in the presence of say, an equal weight or less of paraffin-wax. This can be done in several types of mixers like the Banbury or the Werner-Pfleiderer. If a lower concentration is desired, paraffin-wax should be added slowly after the original rubber-wax composition has been thoroughly mixed. This method can also be used for procuring low concentrations of rubber in wax by carefully diluting to the desired composition.

During the addition of the rubber in the specific example of our prepared composition, the temperature of the bath is permitted to drop to 180° to 190° F. and is maintained at this temperature throughout the compounding operations. After all the rubber has been added the bath is gently stirred with a paddle so as to permit thorough penetration of the paraffin into the rubber and to prevent lumping of the rubber during solution. This stirring operation is continued for about fifteen minutes until the rubber sheets are adequately soaked.

The mixture is then stirred mechanically in a kneader type of mixer until the batch is free of lumps of undissolved rubber. This operation requires 1½ to 2 hours. The temperature of the mass is maintained at 180–190° during the entire period. At the end of this time, any undissolved lumps may be strained out, broken up and returned. However, this is not ordinarily necessary. The composition so prepared is then ready for coating, laminating or direct conversion into thin films.

During the compounding operations it is necessary to keep the temperature of the rubber-paraffin wax mixture at about the temperature indicated in order to avoid overheating, which results in an undesirable darkening of the mass and imparts an odor to it. However, if some slight color and odor are permissible, temperatures up to 200 to 220° F. may be employed. Due recognition should be given to the fact that viscosity of the composition drops if the time of heating is prolonged or if higher temperatures are employed.

Various pigments or other coloring matters, fillers, antioxidants and the like, may be incorporated, either directly or by means of a master batch, into the rubber-wax mixture, depending upon the type of pigment, filler or added ingredient to be incorporated. If a white composition is desired, for example, a white pigment such as titanium dioxide, or mixtures of titanium dioxide with either calcium sulphate or barium sulphate may be incorporated into the composition.

Three general methods of incorporating additional ingredients have been developed by us.

First: Certain pigments, fillers and other materials are mixed directly with the paraffin-wax in quantities up to, say, several percent by weight, such as: Aluminum powder, sulphur, sodium salicylate, sodium benzoate, p, p' dioxy diphenyl cyclohexane (an antioxidant).

Second: Other materials which are not "wetted" readily by the wax are incorporated into a master batch with solid wax, say in a 50–50 mixture, using a Banbury mixer or an ink mill. This is true of such pigments as du Pont Red RL (Schultz Index 189), du Pont Red TX (Schultz Index 189).

Third: Other ingredients to be added are first incorporated in a rubber-paraffin wax master batch which is then added to a previously prepared rubber-wax composition. In this class may be enumerated the following:

Pigments such as titanium oxide, zinc oxide.

Accelerators such "du Pont 552", "Zimate".

Antioxidants such as symmetrical di-beta-naphthyl-para-phenylene-diamine hydroquinone.

The following will serve as an example of our preferred method of incorporating pigment into a rubber-paraffin wax composition, parts by weight being given:

*Example*

A master batch is first prepared in a Banbury mixer, using pale crepe rubber, paraffin-wax and a titanium dioxide pigment.

75 parts of pale crepe rubber are placed in the mixing chamber and the ram is held against the rubber for a sufficient time to break it down, in general from 3 to 4 minutes, depending on the temperature of the mixture. The ram is removed and 75 parts of the pigment are added while the mixer is running; the ram is then replaced and the pigment and rubber allowed to mix for another period of about 5 minutes. It is essential that adequate mixing be produced before proceeding with the next step. For example, some pigments will mill into the rubber much more readily than others so that the length of milling time must be determined by the experience of the operator. After the pigment is well dispersed in the rubber, 150 parts of solid paraffin-wax are added to the rubber-pigment mixture and the batch is allowed to mix for an additional 5 minutes. During the entire process a stream of cold water is allowed to run through the jacket and the rotors of the mixer to prevent the temperature from rising above, say, 180° F. Before discharging the batch the rubber should be well dispersed in the wax.

For incorporation into the ultimate film forming mixture, the master batch of rubber-wax-pigment (or other material which it may be desirable to incorporate into the batch) should preferably be rolled into a thin sheet. This may then be added to the mixer in which the rubber and wax are being kneaded together. It is possible to use the master batch without sheeting but considerably longer time is taken to secure proper incorporation into the film forming material.

We have found that it is possible to vulcanize our rubber-paraffin wax composition at practically any temperature between, say, 70°, and 300° F. However, if such mixtures are vulcanized or even partially vulcanized before being formed into sheets, films or coatings, the entire composition becomes highly viscous and attains a gelled condition so that it cannot be satisfactorily sheeted out or used to coat or laminate fabrics. It is therefore necessary to first form the self-sustaining film or to coat or laminate fabrics and then to vulcanize the composition.

We have found that high vulcanizing temperatures cannot be employed for our preformed films as the film loses its original characteristics and becomes distorted on account of the effect of the high temperature on the composition. It is therefore desirable to vulcanize the films or sheets at low temperatures after being formed. We have found that this can be readily effected by the use of super-accelerators which permit self-curing after the film is formed. For this purpose we may use the "split batch" method of compounding our ingredients.

Examples of super accelerators that can be satisfactorily used are the following:

"Butyl zimate"__ A zinc salt of dibutyl dithiocarbamate
"Zimate"________ Zinc dimethyl dithiocarbamate
"R-2"___________ The reaction product of carbon bisulphide and methylene dipiperidine
"ZBX"___________ Zinc butyl xanthate
"552"___________ Piperidine pentamethylenedithiocarbamate To avoid vulcanization when subjected to the high temperatures required for the film forming operation, two batches are prepared and mixed just before the film is to be formed. The final batch is made in such quantities that it will not gell within the normal operating time for using it up even at the temperatures obtaining in the coating, laminating or film forming operation. Thereafter, notwithstanding the relatively low temperatures prevailing during the storage of the product, the accelerators are effective in bringing about vulcanization in a period, say, of up to several weeks.

The following example will serve to illustrate our preferred method of making vulcanized sheets, according to which master batches, one containing the vulcanizing agent and activator or pigment and the other containing the accelerator, are first made and then proportionate quantities of these master batches are incorporated into split batches, and the split batches mixed just prior to the film forming operation:

*Example*

Two master batches are prepared, one containing the vulcanizing agent and activator and the other containing the accelerator. Suitable compositions for the master batches are:

| | Per cent |
|---|---|
| Paraffin-wax | 50 |
| Rubber | 25 |
| Added ingredients—sulphur and pigment, or accelerator | 25 |

For convenience the amount of rubber and paraffin-wax introduced with the master batches into the final composition is disregarded.

The method, using a small Banbury mixer, of preparing a master batch is as follows:

Seventy-five grams of pale crepe rubber are placed in the mixing chamber and the ram is held against the rubber for a sufficient time to break it down, in general from 3 to 4 minutes, depending on the temperature of the mixture. The ram is removed and 75 grams of sulphur and pigment, (and/or accelerator for the second master batch) are added while the mixer is running. The ram is then replaced and the added agents and rubber allowed to mix for another period of about 5 minutes. It is essential that adequate mixing be produced before proceeding with the next step. After the material is well dispersed in the rubber, 150 grams of solid paraffin-wax are added to the rubber-mixture and the batch is allowed to mix for an additional 5 minutes. During the entire process a stream of cold water is allowed to run through the jacket and the rotors of the mixer to prevent the temperature rising above, say, 180° F. Before discharging the batch the operator should inspect it thoroughly to see that the rubber is well dispersed in the wax.

For incorporation into the ultimate film forming mixture, the master batch of rubber-wax-pigment (or other material which it may be desirable to incorporate into the batch) should preferably be rolled into a thin sheet. This may then be added to the mixer in which the rubber and wax are being kneaded together. It is possible to use the master batch without sheeting but considerably longer time is taken to secure proper incorporation into the film forming material.

The final batch of rubber-wax composition may suitably have the following proportions by weight of materials:

| | Per cent |
|---|---|
| Accelerator | ½ |
| Sulphur | ½ |
| Zinc oxide | ½ |
| Paraffin-wax (M. P. 130–2° F.) | 83½ |
| Pale crepe rubber | 15 |

To prepare such a composition, two batches of paraffin wax-rubber mixture are prepared, each weighing, say 50 lbs. and each containing one half of the wax and rubber to be present in the final batch, in the proportions as shown in the foregoing formula. Then to one batch is added ½ lb. of accelerator, for instance, piperidine pentamethylenedithio carbamate, in the form of the 25% master batch previously prepared as described; and to the other batch is added ½ lb. of sulphur and ½ lb. of zinc oxide in the form of the 25% master batch containing these agents.

Each batch is mixed thoroughly. Equal portions of the two baches are then mixed thoroughly just prior to use in making the film material. It is necessary to convert this composition into films or sheets as soon as it is made up as the final mixture will set up or gell to an unworkable condition almost immediately. We have found that as the temperature is raised the gelling rate is increased. After conversion and when kept at room temperature, it will require for from one to two weeks for satisfactory vulcanization to take place.

When a milder cure is desired the proportions of accelerator and vulcanizing agent used are reduced. For example, in the final batch of the aforementioned example, the accelerator may be reduced to ⅛% and the sulphur to ¼%. This freshly prepared composition can be kept at not over 180° F. and used any time within eight to ten hours after it is compounded, without gelling sufficiently to render it unworkable.

When translucency is desired it is preferable to use zinc carbonate instead of zinc oxide in the above composition.

The vulcanizing film will shrink in the grain direction much less than the unvulcanized film when subjected to elevated temperatures and will more successfully resist the action of ultra-violet light and will still retain its self-sustaining properties at elevated temperature. The vulcanized film in also more resistant to solvents than the unvulcanized film. However, the vulcanized film has lost its ability to "heat-seal" to itself, to paper and other sheet materials which is desirable for some purposes. These properties may be increased or diminished in degree by controlling the degree of vulcanization.

Antioxidants may be incorporated into our rubber-paraffin-wax composition whether it is to be vulcanized or not. We have found the following antioxidants suitable: hydroquinone, pyogallol, para-hydroxy-phenyl morpheline, aniline-beta-naphthol.

The addition of these antioxidants, age resistors or photo-chemical inhibitors increases the resistance of the finished sheet or film to the action of light and air.

Where it is desired to make the film more sticky, up to 15% of a gum or resin, such as rosin, may be added to replace an equal weight of wax, similarly, the gloss may be improved and a harder film produced by the addition of a hydrogenated vegetable oil, such as cottonseed, in amounts up to, say, 15% by weight, to replace an equal weight of wax.

During mixing and before the final rubber-paraffin wax batch is ready to be supplied to the film forming machine, it is subjected to a vacuum of 15 to 20 inches of mercury, preferably as high as is practical of attainment, to eliminate air from the batch and prevent its inclusion in the film We have also succeeded in preparing flexible, self-sustaining films from compositions consisting of asphalt and rubber. In preparing such compositions, we may for example, take 7½ parts by weight of rubber and dissolve same in 42½ parts by weight of paraffin-wax. This mixture is then added to 50 parts by weight of asphalt (Paradura), which has been melted and heated to about 350° F. The composition is intimately mixed and can be formed into a film which is non-tacky and flexible by sheeting out on a chilled forming roller similar to the method used in making films from rubber-wax compositions. The asphalt in its original state is brittle and not flexible but by the addition of the rubber binder to same, it becomes flexible and can be formed into a self-sustaining film.

We have also prepared compositions comprising asphalt and 10% by weight of rubber from which we have formed self-sustaining sheets or films. The tackiness, strength, and flexibility of such sheets is dependent upon the type of asphalt used. By selecting high melting point asphalts, it is possible to produce films which are flexible and non-tacky but when these are desired the time of heating must be carefully controlled.

After much experimentation we have ascertained the important factors which affect the viscosity and adhesiveness of our composition as well as the characteristics of the final product. These factors must be carefully controlled and coordinated in order to produce uniform results. Compositions containing rubber and wax have been hitherto known as disclosed, for instance, in British Patent No. 1962 of 1865 to Abel for a Composition of rubber and paraffin-wax for impregnating paper, leather, and textiles. U. S. patent to Van Tassel No. 1,745,591, Dunham No. 1,677,435 and Gray No. 1,968,140 also discloses similar compositions. These patents are typical of the prior art and they fail to teach the essential features of our invention as herein disclosed.

The purpose in preparing such previously known compositions has always been to produce low viscosity solutions for penetrating or soaking sheet materials. Our composition, however, is prepared with a predetermined high viscosity and resulting cohesiveness, so that when used for coating it will be not penetrate or soak through the sheet material but instead will form an impervious superficially adherent coating. Furthermore we have discovered that our composition can be converted into thin flexible self-sustaining films.

The production of compositions have a predetermined viscosity is therefore an important feature of our invention as the proper coating and film forming characteristics of our composition are determined thereby.

Since compositions of rubber and wax, for example, have widely varying viscosities, depending upon the proportions and particular ingredients used and upon the conditions of preparation, we have found it most satisfactory to determine first the permissible viscosities for coating, laminating or for making the composition into sheet or film material and then to adjust the proportions and conditions so as to obtain viscosities within the permissible range. In general, rubber-wax compositions having viscosities lower than 8000 seconds (50 cc. measured on a Scott viscosimeter at 90° C.) cannot satisfactorily be made up into self-sustaining sheets or used for coating and laminating papers for our purposes. Ordinarily we prefer to use rubber-wax mixtures having viscosities greatly above this lower limit, such as viscosities of between 300,000 and 1,000,000 seconds (Scott). The upper limit of the permissible viscosity range is too high to be measured satisfactorily on a Scott viscosimeter.

We have also found that the tensile strength and stretch of the film are closely related to the viscosity of the composition, increasing with the increased viscosity of the mixture used for film formation.

We have found furthermore the following factors are important to control in our invention: (1) selection of suitable body substance and binder; (2) proper proportions of these substances; (3) the temperature of compounding; (4) the time of compounding; (5) the physical characteristics of the binder used; (6) the character of agitation of the ingredients; (7) the effect of other added ingredients. These factors must be properly controlled and coordinated in order to produce uniform results.

We have previously discussed the selection of suitable thermoplastic substances and their proportions. As the proportion of the binder, such as rubber, is increased in our composition, the viscosity of the composition will increase in proportion and the tensile strength of the product is also increased.

As the amount of binder is increased in the mixture the time of heating for producing a predetermined viscosity is increased. The stretch of rubber-wax films, for example, made from mixtures having the same viscosity, but having different amounts of rubber, increases with the rubber content of the mixture.

The temperature of compounding for our preferred wax-rubber composition is 180° to 190° F. but continued heating at this temperature will cause lower viscosity, discoloration and odor. As the temperature is increased, the viscosity is lowered more rapidly in a given time. Heating of our rubber-wax composition for periods above, say, ten hours at 180 to 190° is undesirable as it causes discoloration and odor.

We have found that with a given concentration of pale crepe rubber in wax, the viscosity at a given temperature is inversely proportional to the temperature to which the mixture has been heated during or after the solution period. For instance, the effect of temperature on the viscosity of a solution of 6% pale crepe rubber in paraffin-wax was determined by quickly heating the mixture to a given temperature and holding at that temperature for one hour, with the following results:

| Temperature (1 hour) | Viscosity (Scott at 90° C., 50 cc.) |
| --- | --- |
| 150° F. | 12,000 |
| 250° | 6,500 |
| 300° | 1,000 |

In preparing our rubber-wax composition, it is desirable to carry out the operations in the minimum time necessary to effect complete solution of the rubber in the wax to produce a uniform composition. In prolonging the time of compounding the viscosity of the composition is lowered. This also causes a decrease in the tensile strength of the product. Inasmuch as in our preferred composition the mixture is maintained at a temperature of 180 to 190° F., prolonged heating causes discoloration and odor in the mixture.

With given proportions the time of compounding a uniform mixture is determined by the thickness of the rubber sheets used, the temperature of compounding and character of agitation. An increase in the thickness of the rubber sheets used will increase the time of solution. By increasing the temperature the time of compounding is reduced, but as previously pointed out, too high temperatures cannot be employed.

Inasmuch as the rate of solution of the rubber sheets is dependent on the area of rubber subjected to the action of the molten paraffin, the physical formation of the rubber sheets is also an important factor. A thin sheet of pale crepe rubber, for example, contains many spaced small nodules of rubber. In soaking this sheet in a paraffin bath, the paraffin penetrates the spaces between the nodules causing more rapid solution of the rubber than would occur if there were no spaces as in smoked sheet rubber.

We have found that the thickness of the rubber sheets used is important because the thinner the sheets of rubber used, the less time is required to dissolve the rubber. For example, in compounding 15% rubber by weight in paraffin-wax (M. P. 130° F.) at 180° F. using a kneader mixer, the rubber used being bandage pale crepe sheets of 0.015 to 0.020 inches thickness, the time for obtaining complete solution is about one hour. When using a grade of rubber known as RMCA pale crepe rubber sheets having a thickness of 0.030 to 0.040 inches, the time of solution is 1½ to 2 hours under the same conditions. Regular pale crepe having 0.060 to 0.070 inches thickness requires about four hours or more for complete solution under the same conditions. The thickness of the rubber sheets used thus determines the time of compounding which must be carefully controlled and coordinated with the other factors mentioned.

We find it advantageous to use unmilled pale crepe rubber as it gives a product comparatively free of odor, taste, and color. In general we have found that higher percentages of milled rubber are required to give viscosities corresponding with those obtained by the use of unvulcanized, unmilled rubber due to the breaking down of the rubber during the milling operation.

We have found that it is important to regulate the character of agitation in preparing the rubber and paraffin mixture. Any suitable means may be used for this purpose such as a kneading type of mixer or ordinary rubber cement mixer. The mixer should be operated so as to effect the complete dispersion of the rubber in the minimum time without substantially breaking down the internal structure of the rubber aggregates in order to avoid reducing the final viscosity below the desired limits. The time of compounding will, of course, be dependent on the type of mixer used.

Continuous mechanical stirring of a rubber-wax composition during heating reduces the viscosity as compared to the viscosity of the same composition when stirred only occasionally under the same conditions.

The effect of adding other specific ingredients, such as accelerators, pigments or fillers, to the body and binder of our composition must be considered in relation to the viscosity and desired characteristics of the final product and properly compensated for by varying the other mentioned factors. The effect of some added ingredients may be to lower the viscosity while the other added ingredients may increase the viscosity. For example, additional viscosity may be obtained over that of pure paraffin wax alone by the addition to paraffin of other materials such as aluminum stearate, but the resultant mixture does not have as good adhesiveness nor moistureproofness as a rubber-paraffin mixture of equal viscosity.

The properties of our composition and product are thus entirely dependent upon the proper control of the aforementioned factors which must be carefully coordinated and adjusted for each composition.

We have devised several methods and apparatus for converting our composition into thin continuous, flexible, self-sustaining sheets or films. In general, our method consists in forming our hot viscous composition into a sheet of the desired thickness and then cooling it so as to make it self-sustaining.

The following methods are illustrative of our procedure when converting our composition into films. The particular apparatus selected for our sheeting operations depends upon the character and viscosity of the composition to be sheeted and efficiency of the operation desired. When sheeting, for example, a wax-rubber composition having from about 6 to 15% rubber, we may utilize the apparatus illustrated in Fig. 1.

Figure 1:
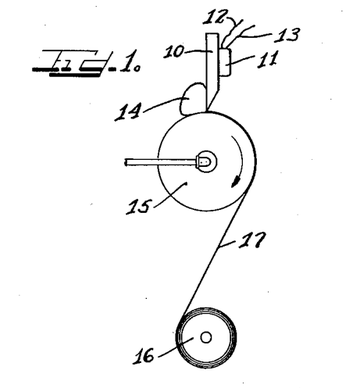
Fig. 1 is a diagrammatic side elevational view of our apparatus suitable for forming films or sheets from our composition.

The hot composition 14 is sheeted out by an electrically heated stationary doctor blade 10 to which is attached a heating element 11 for maintaining the temperature of the doctor blade suitable for the type of composition used. The sheeted composition is drawn around the chilled roll 15, stripped at a suitable point on its circumference and then wound up on roller 16. The thickness of the sheet formed is regulated by adjusting the distance between the doctor blade and the forming roll. The doctor blade may have a straight or rounded edge.

Figure 2:
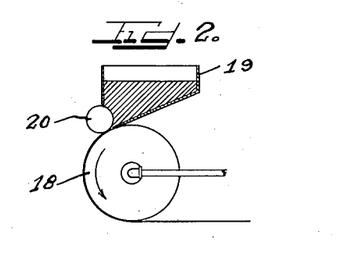
Fig. 2 is a diagrammatic side elevational view partly in section of another apparatus for forming films.

Fig. 2 illustrates another apparatus which we have devised as suitable for sheeting rubber-wax compositions having from 6 to 25% rubber therein. It consists essentially of a large cooling roll 18, having attached to it a heated hopper 19 and a heated doctor roll 20, revolving in the same direction as the cooling roll. We have found that it is desirable to rotate the roll 20 at a surface speed less than the forming roll 18 in order to avoid the formation of ridges or other irregularities in the film as it is being formed. The rotating doctor roll also serves to remove any foreign particles which may collect between the doctor roll and the forming roll. These particles if not removed cause slits or tears to form in the film. When sheeting out wax-rubber compositions containing about 15% rubber, the surface speed of the roll 20 should not be more than about 15% of the speed of roll 18 in order to produce a smooth surfaced film. However, if a ridged film is desirable, we can rotate the roll 20 at higher speeds.

The rubber-wax composition is maintained at a temperature of about 180° F. by the heated walls of the hopper and is chilled as it is drawn around the forming roll where it is formed into a flexible self-sustaining film. The structural features of this apparatus are claimed in copending application Serial No. 40,764 executed of even date herewith.

Figure 3:
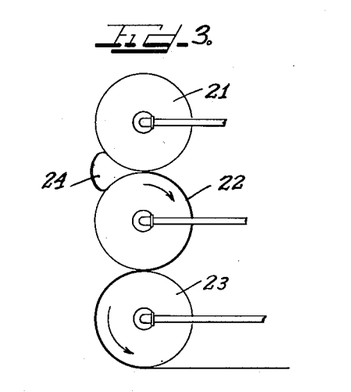
Fig. 3 is a diagrammatic side elevational view of a calendar for doctoring our composition into films.

In Fig. 3 we illustrate an apparatus suitable for sheeting out our rubber-wax composition having a rubber content of about 25 to 50%. The apparatus used consists of three superimposed rolls. The upper roll 21 is heated to a temperature of about 180° F. and coacts with the middle roll 22, heated to about 100–110° F. The upper roll 21 is stationary, or may revolve very slowly in the same direction as the middle roll 22. The hot viscous composition is sheeted out between rolls 21 and 22 and then passes around roll 23 where it is chilled to about 50° F. and is stripped therefrom in the form of a self-sustaining sheet.

When employing this method it is necessary to carefully control the temperatures of the two top rolls. The top roll should be geared to the proper surface speed to act as a doctor roll and still turn sufficiently fast to roll specks of dirt and foreign substances through the nip of the rollers to eliminate tears or slits in the formed film.

Figure 4:
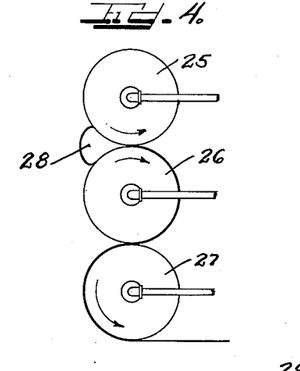
Fig. 4 is a diagrammatic side elevational view of a calendar for rolling films from our composition.

We may also form our rubber-wax composition, comprising 50% or more rubber into sheets by using a calendering-rolling method on an apparatus as illustrated in Fig. 4, employing three superimposed rotating rolls. The upper roll 25 is heated to 120° F., the middle roll is heated to 130–135° F. and the lower roll is heated to about 50° F. The composition 28 is rolled between the two upper revolving heated rolls and chilled on the lower roll.

Figure 5:
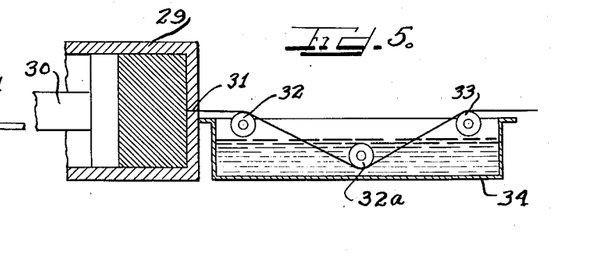
Fig. 5 is a diagrammatic side elevational view partly in section of our extruding device for forming films from our composition.

Our composition may also be extruded into self-sustaining sheets as shown in Fig. 5. The composition is forced by ram 30 through an adjustable extruding orifice opening 31 and formed into a film which is led over a cooled guide roll 32 supported on a tank 34, into cooling water over guide roll 32a and out of the tank over guiding roll 33. These guide rolls are driven in synchronism with the rate of extruding.

Figure 6:
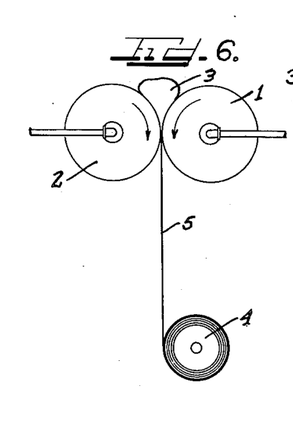
Fig. 6 is a diagrammatic side elevational view of two squeeze rolls for forming a film from our composition.

It is also possible to form self-sustaining sheets from our thermoplastic composition by rolling out the hot composition 3, between two chilled squeeze rollers 1 and 2 spaced apart as shown in Fig. 6 to produce a sheet 5 of the desired thickness.

The thin flexible self-sustaining sheets or films produced by any of the methods described above are particularly adapted for wrapping purposes. When formed from a rubber-wax composition of the type described, the sheet or film material is practically moistureproof and waterproof and, if not vulcanized, has excellent heat sealing properties without being tacky at ordinary room or atmospheric temperatures. The sheet or film material may be either semi-transparent or opaque, depending upon whether pigments or fillers are incorporated into the composition or not.

A much more translucent film will be obtained if the film is made thinner; also other conditions being the same, if the sheet or film is chilled very rapidly on the forming roll. For that reason the surface temperature of the roll should be kept at a low temperature such as from 35° F. down to 0° F. Not only is the translucency and gloss of the sheet improved by this sudden cooling, but the flexibility, tensile strength, stretch and its resistance to the passage of water vapor are also greatly improved.

The rubber-wax composition sheets or films of our invention can be prepared in a continuous manner and with a uniform thickness of only one thousandth of an inch up to any desired thickness. For most purposes our film has a thickness of from .004 to .005 inches.

Figure 7:
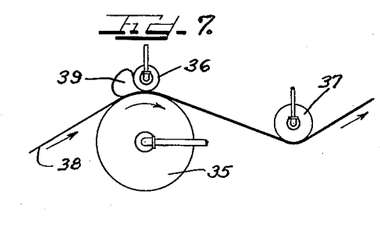
Fig. 7 is a diagrammatic side elevational view of an apparatus suitable for continuously coating our composition on webs.

We have also devised several methods and apparatus for using our compositions in continuously coating and laminating webs of fibrous materials. In applying our rubber-wax composition to paper, for example, containing up to 20% rubber, in film weights up to 7# per thousand square feet, we lead the paper web over a heated rubber covered supporting roll 35 as shown in Fig. 7. A hot doctor roll 36 turns in the same direction as the paper web travels from about 4% to 15% of the surface speed of the supporting roll, depending upon the viscosity of the composition used. The hot viscous rubber-wax composition 39 is simultaneously sheeted out and applied to the surface of the paper web 38 as it passes between the nip of rolls 35 and 36 and it is then congealed as it passes over the chilled roll 37.

Figure 8:
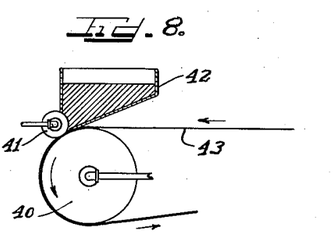
Fig. 8 is a diagrammatic side elevational view partly in section of another apparatus for coating webs.

Another method illustrated in Fig. 8 for coating webs with thicker films consists in passing the web of paper around a chilled supporting roll 40 and doctoring the rubber-wax composition on the paper by means of a hot roll 41 rotating in the same direction as the supporting roll. The hot viscous composition is sheeted out between rolls 40 and 41 as it is supplied from the heated hopper 42 and applied directly to the paper web 43 passing therebetween.

Figure 9:
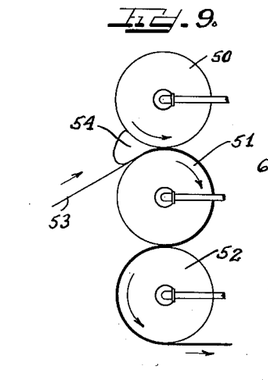
Fig. 9 is a diagrammatic side elevational view of an apparatus for coating webs by a calendering-doctoring method.
Figure 10:
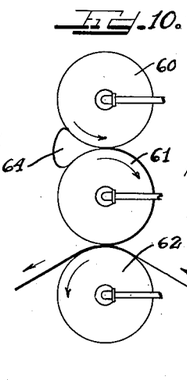
Fig. 10 is a diagrammatic side elevational view of our apparatus for coating webs by a calendering-rolling method.

We may also coat fibrous webs with our composition by calendering as shown in Figs. 9 and 10, using three superimposed rolls. In Fig. 9 the upper roll 50 is heated to the proper temperature depending upon the composition used and the two lower rolls 51 and 52 are cold. The web of paper is passed between rolls 50 and 51 and around roll 52 and the composition 54 is supplied to the two upper rolls. The upper roll 50 rotates in the direction of travel of the web. It may be stationary or rotate at a slower surface speed than that of roll 51. This method is suitable for wax-rubber compositions containing from 25 to 50% rubber.

According to another method, the composition is first sheeted out and then applied to the web. This is shown in Fig. 10 where the composition 64 is sheeted between heated rolls 60 and 61. The paper web 63 is fed between the two lower rolls 61 and 62 and the formed film is applied thereto as it passes in the nip of rolls 61 and 62. The lower roll 62 is chilled in order to congeal the film as it is applied to the paper web. This method is suitable for wax-rubber compositions containing over 50% rubber.

Figures 11, 12:
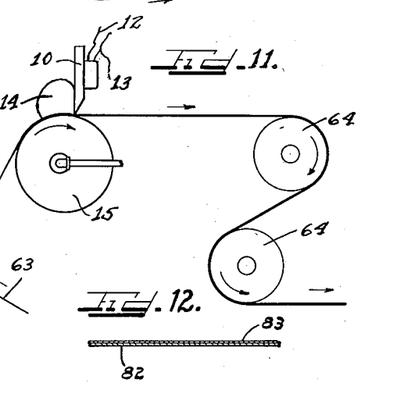
Fig. 11 is a diagrammatic side elevational view of our apparatus for coating webs by means of a heated doctor blade.
Fig. 12 is a cross-sectional view of a coated web more in accordance with our invention.

We may also coat fibrous webs by employing a stationary doctor bar and heated roll as shown in Fig. 11. The web is passed around roll 15 and the hot viscous composition is coated thereon by means of the electrically heated doctor blade 10 which is adjustable to control the thickness of the coating. The coated web is then passed around chilled rolls 64 and 65. This method is disclosed and claimed in copending application Serial No. 693,741.

Fig. 12 is a cross-sectional view of our coated paper which consists of a sheet 82 having a superficially adherent flexible coating 83 thereon. Paper coated with our rubber-wax composition is water and moistureproof. The coating is non-tacky, flexible and adheres to the superficial surface of the web without striking through and with little penetration into the web but remains as a surface layer. The coated paper is tasteless, odorless, gasproof and suitable for wrapping foods or for containers. Our coated paper can be wrinkled or folded without losing its moistureproofness as occurs with ordinary paraffin-wax coated paper. The coated paper is also heat sealing and can be made to adhere to an uncoated sheet by merely superimposing the coated sheets and applying heat and pressure.

Paper coated with our self-vulcanizing rubber-wax composition is also water- and moistureproof. At elevated temperatures the coating is tough, non-adhesive and non-tacky.

The ability of a composition to strike through during coating depends upon the weight and kind of paper used. The less hydrated and thinner papers require a solution of greater viscosity to prevent penetration, whereas solutions of lower viscosities can be employed with heavier and/or more highly hydrated papers. Consequently, the viscosity of the rubber-wax solution for coating purposes may be as low as 1000 to 2000 secs. when the solution is to be used with heavier and/or more hightly hydrated paper or with other sheet material having greater impenetrability toward the coating solution. In coating ordinary sulphite pulp stock of about 17 lb. weight per ream (24 x 36—480), we have found that a wax-rubber composition containing 12% rubber and having a viscosity of at least 8000 secs. (Scott) will not strike through the paper.

Figure 13:
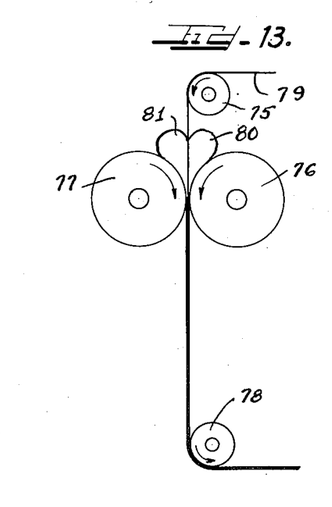
Fig. 13 is a diagrammatic side elevational view of an apparatus for coating both sides of a web.

For coating both sides of a web with our composition, we employ an apparatus illustrated in Fig. 13. The web is led over guide roll 75 and passed between heating rolls 76 and 77. The composition 80, 81 is supplied to both sides of the web 79 and is applied as a coating by rolls 76 and 77. The web is then led over a cooled roll 78 to congeal the coating.

Figure 14:
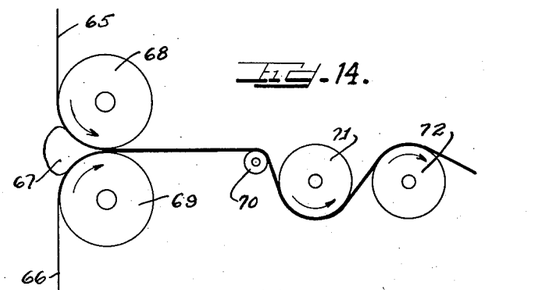
Fig. 14 is a diagrammatic side elevational view of a laminating apparatus.

In Fig. 14 we illustrate an apparatus suitable for laminating webs of fibrous materials using our composition. The webs 65 and 66 are led over steam heated rolls 68 and 69 respectively and the hot viscous composition 67 is applied therebetween to unite the two webs. The laminated sheets are then passed over guide roll 70 and around chilled rolls 71 and 72. The rolls 68 and 69 are adjustable for controlling the thickness of the composition between the webs. In using wax-rubber compositions as the bonding medium, we find it advantageous to chill the laminated web as quickly as possible. This gives a very superior bonding film in the laminated product as contrasted with a slowly cooled film of our wax-rubber composition. Quick cooling results in a composition of greater flexibility, transparency, gloss, stretch, tensile strength and moistureproofness.

Figure 15:
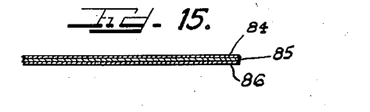
Fig. 15 is a cross-sectional view of a laminated web made in accordance with our invention.

Fig. 15 illustrates a cross-sectional view of our laminated sheet material, which consists of two sheets 84 and 86 united by a layer 85 therebetween. Our laminated sheet material has the advantage of being moistureproof, waterproof and gasproof to a high degree. At the same time, white laminations may be produced by the use of white sheet material for the constituent plies. The flexibility of the adhesive seal uniting the laminations is such that the laminated paper or the like can be creased or otherwise distorted without breaking down the moistureproofness and waterproofness of the adhesive layer and the component plies can rarely be separated, when our preferred wax-rubber composition is used, without rupturing the material of the laminations themselves. In addition a printable and glueable product is obtained.

The laminated product and method of making same are claimed in our copending application Serial No. 40,766 executed of even date herewith.

Where viscosity is expressed in the claims, it will be understood as having been determined on a Scott viscosimeter at 90° C. by measuring the time in seconds required for a flow of 50 cc. of the composition through the instrument.

The term "rubber" as used in the appended claims is intended to include the use of india rubber (such as pale crepe rubber and smoke sheet rubber), gutta rubber, synthetic rubber or other artificially produced gummy substances which are suitable for the purpose of this invention, singly or mixtures thereof.

The term "wax" as used in the appended claims is intended to include the use of paraffin-wax, beeswax, spermaceti, candelilla, carnauba and their natural or synthetic equivalents, or mixtures thereof, suitable for the purpose of this invention.

The term "asphalt" as used in the appended claims is intended to include asphalts which are solid, brittle and not flexible under normal conditions.

Although we have described our invention in detail and therefore utilized certain specific terms and language herein, it is to be understood that the present disclosure is illustrative, rather than restrictive, and that changes and modifications may be resorted to without departing from the spirit or the scope of the claims appended hereto.

We claim as our invention:

1. A composition for forming flexible sheets, films or coatings comprising a body portion and a binder portion intimately mixed therewith and having a viscosity of at least 8000 secs. (Scott viscosimeter at 90° C.); said body portion consisting of a thermoplastic substance selected from the group consisting of wax and asphalt and which is brittle and not flexible at ordinary temperatures, insoluble in water, solid at ordinary temperatures, liquefiable at higher temperatures and capable of acting as dispersing medium or solvent for the binder added thereto; said binder portion consisting of a thermoplastic, elastic, flexible substance insoluble in water and solid at ordinary temperatures selected from the group consisting of india rubber, gutta rubber, synthetic rubber and rubber-like substances, singly or mixtures thereof.

2. A composition as defined in claim 1 in which the body portion consists of wax and the binder portion consists of Viskanol.

3. A composition for forming vulcanized, flexible sheets, films or coatings comprising wax, rubber, a vulcanizing agent, accelerator and activating agent compounded under controlled temperature, time and character of agitation so as to have a viscosity of at least 8000 secs. (Scott).

4. A composition for forming vulcanized, flexible sheets, films or coatings comprising wax, rubber, a vulcanizing agent, accelerator, activator, pigment, and an age resistor, compounded under controlled temperature, time and character of agitation so as to have a viscosity of at least 8000 secs. (Scott).

5. The method of preparing a thermoplastic composition which comprises preparing a molten bath of a thermoplastic substance selected from the group consisting of wax and asphalt and which is insoluble in water, solid at ordinary temperatures, liquefiable at higher temperatures, brittle and inflexible at ordinary temperatures, dissolving therein a thermoplastic, elastic, flexible substance selected from the group consisting of india rubber, gutta rubber, synthetic rubber and rubber-like substances, singly or mixtures thereof in sufficient proportions under controlled temperature, time and quality of agitation to produce a suitable viscosity for converting the composition into flexible self-sustaining films or coatings.

6. The method of forming flexible sheets, films or coatings from a low temperature, self-vulcanizing wax-rubber composition, which comprises the steps of preparing a separate batch comprising molten wax as a major ingredient, rubber, vulcanizing agent and activator, and a separate batch comprising molten wax as a major ingredient, rubber and a superaccelerator, then combining the two batches and forming sheets, films or coatings therefrom.

7. The method of forming flexible sheets, films or coatings from a low temperature self-vulcanizing wax-rubber composition which comprises the steps of preparing a master batch containing wax as a major ingredient, rubber, a vulcanizing agent and an activator, preparing another master batch containing wax as a major ingredient, rubber, and superaccelerator, forming the said batches separately into sheet form, adding the first mentioned master batch in sheet form to a previously prepared molten rubber-wax composition and intimately mixing same, adding the second mentioned master batch in sheet form to another equal portion of the previously prepared molten rubber-wax composition and intimately mixing same, then intimately mixing the two batches thus prepared to form the final composition and forming flexible sheets, films or coatings therefrom.

8. The method of forming flexible sheets, films or coatings from a low temperature, self-vulcanizing rubber-wax composition which comprises the steps of preparing a master batch containing wax as a major ingredient, rubber, a vulcanizing agent and an activator, preparing another master batch containing wax as a major ingredient, rubber, and superaccelerator, adding the first mentioned master batch to a previously prepared molten rubber-wax composition and intimately mixing same, adding the second mentioned master batch to another equal portion of the previously prepared molten rubber-wax composition and intimately mixing same, then intimately mixing the two batches thus prepared to form the final composition and forming flexible sheets, films or coatings therefrom.

9. A relatively thin, flexible, self-sustaining film of a vulcanized composition comprising rubber and wax.

10. A relatively thin, flexible, self-sustaining film of a vulcanized composition comprising pale crepe rubber and paraffin-wax.

11. A relatively thin, flexible, self-sustaining film of a vulcanized composition comprising from 6 to 30% of rubber and from 94 to 70% of wax by weight.

12. A relatively thin, flexible, self-sustaining film of a vulcanized composition comprising rubber, wax and an antioxidant.

13. A relatively thin, flexible, self-sustaining film of a vulcanized composition comprising rubber, wax, a pigment and an antioxidant.

14. A relatively thin, flexible, self-sustaining film of a vulcanized composition comprising rubber, wax and a pigment.

15. A relatively thin, flexible, self-sustaining film of a vulcanized composition comprising wax and from 6 to 15% pale crepe rubber by weight.

16. A relatively thin, flexible self-sustaining film of a vulcanized composition comprising wax and from at least 25 to 50% rubber by weight.

17. A relatively thin, flexible, self-sustaining film of a vulcanized composition comprising from 6 to 30% pale crepe rubber and from 94 to 70% of paraffin-wax by weight.

18. Flexible, self-vulcanizing sheets, films or coatings made from a wax-rubber composition formed by preparing a separate batch comprising molten wax as a major ingredient, rubber, vulcanizing agent and activator, and a separate batch comprising molten wax as a major ingredient, rubber and an accelerator, the said batches being mixed prior to forming sheets, films or coatings therefrom.

19. A relatively thin, flexible, self-sustaining film formed from a composition comprising a homogeneous mixture of asphalt and rubber produced by the method of claim 5.

20. A relatively thin, flexible, self-sustaining film formed from a composition comprising a homogeneous mixture of wax and "Viskanol".

ALLEN ABRAMS.
CHARLEY L. WAGNER.
GEORGE W. FORCEY.

DISCLAIMER 2,054,115.—*Allen Abrams, Charley L. Wagner,* and *George W. Forcey,* Wausau, Wis. COMPOSITION FOR COATING, LAMINATING, AND FILM FORMING. Patent dated September 15, 1936. Disclaimer filed December 11, 1939, by the assignee, *Marathon Paper Mills Company.*

Hereby disclaims from the scope of claim 1 of said patent any composition except such as are compounded while at a controlled temperature above the melting point of the body portion and have the viscosity set forth in said claim as a property of said composition as it is initially compounded and used;

And hereby disclaims from the scope of claim 2 of said patent any composition except such as are compounded while at a controlled temperature above the melting point of the wax and have the viscosity as set forth in the said claim as a property of said composition as it is initially compounded and used.

[*Official Gazette January 2, 1940.*]